(12) United States Patent
Samuel

(10) Patent No.: US 10,961,786 B2
(45) Date of Patent: Mar. 30, 2021

(54) TUBULAR WEAR VOLUME DETERMINATION USING ADJUSTABLE WEAR FACTORS

(71) Applicant: Landmark Graphics Corporation, Houston, TX (US)

(72) Inventor: Robello Samuel, Cypress, TX (US)

(73) Assignee: Landmark Graphics Corporation, Houston, TX (US)

( * ) Notice: Subject to any disclaimer, the term of this patent is extended or adjusted under 35 U.S.C. 154(b) by 222 days.

(21) Appl. No.: 15/745,858

(22) PCT Filed: Sep. 1, 2015

(86) PCT No.: PCT/US2015/047950
§ 371 (c)(1),
(2) Date: Jan. 18, 2018

(87) PCT Pub. No.: WO2017/039644
PCT Pub. Date: Mar. 9, 2017

(65) Prior Publication Data
US 2018/0216412 A1    Aug. 2, 2018

(51) Int. Cl.
| E21B 12/02 | (2006.01) |
| E21B 47/00 | (2012.01) |
| E21B 47/007 | (2012.01) |
| E21B 44/00 | (2006.01) |
| G01V 9/00 | (2006.01) |

(52) U.S. Cl.
CPC .............. *E21B 12/02* (2013.01); *E21B 44/00* (2013.01); *E21B 47/00* (2013.01); *E21B 47/007* (2020.05); *G01V 9/00* (2013.01)

(58) Field of Classification Search
CPC .......... E21B 12/02; E21B 44/00; E21B 47/00; E21B 47/0006
See application file for complete search history.

(56) References Cited

U.S. PATENT DOCUMENTS

| 3,682,256 | A | * | 8/1972 | Stuart | E21B 47/00 175/40 |
| 4,744,030 | A | | 5/1988 | Carlson et al. | |
| 2008/0217987 | A1 | * | 9/2008 | Southard | E21B 4/006 299/60 |
| 2012/0080184 | A1 | | 4/2012 | Jahangir et al. | |
| 2014/0214326 | A1 | * | 7/2014 | Samuel | E21B 47/00 702/11 |
| 2015/0176401 | A1 | * | 6/2015 | Robello | E21B 44/00 702/6 |

FOREIGN PATENT DOCUMENTS

WO   WO 2014/209282 A1   12/2014
WO   WO 2015/002653 A1    1/2015

OTHER PUBLICATIONS

International Search Report and The Written Opinion of the International Search Authority, or the Declaration, dated May 27, 2016, PCT/US2015/047950, 13 pages, ISA/KR.

* cited by examiner

*Primary Examiner* — Caroline N Butcher
(74) *Attorney, Agent, or Firm* — Haynes and Boone, LLP

(57) ABSTRACT

Tubular wear volume is determined using adjustable wear factors. The wear factors are applied as a function of the side force factor, friction factor, and/or temperature factor. The adjusted wear factors are then used to determine the tubular wear volume.

17 Claims, 6 Drawing Sheets

Wear Factor vs. Side Force

US 10,961,786 B2

TUBULAR WEAR VOLUME DETERMINATION USING ADJUSTABLE WEAR FACTORS

PRIORITY

The present application is a U.S. National Stage patent application of International Patent Application No. PCT/US2015/047950, filed on Sep. 1, 2015, the benefit of which is claimed and the disclosure of which is incorporated herein by reference in its entirety.

FIELD OF THE DISCLOSURE

The present disclosure relates generally to the field of hydrocarbon reservoirs and, more specifically, to techniques for reducing and/or eliminating casing wear during downhole operations.

BACKGROUND

To produce hydrocarbons from subterranean reservoirs, oilfield operators drill and case the borehole. When doing so, a shallow portion of the borehole may be cased to protect the water table from possible contamination by hydrocarbons and drilling fluids, whereas deeper portions of the borehole may be later cased as needed to facilitate the drilling process or completion of the well.

Each borehole is typically cased with a casing string, i.e., lengths of steel pipe threaded together and lowered into the borehole before being cemented in place. Despite being made of steel and secured by cement, casing strings can fail. Among the many factors that may contribute to casing failure is internal casing wear. The main cause of such casing wear is the frictional rubbing of other tubular strings on the inner surface of the casing string. For example, as a drill string moves and rotates inside a casing string, it rubs against the inner surface of the casing string, potentially reducing the wall thickness and thereby degrading the casing string's integrity and resistance to deformation.

Operators attempt to anticipate, and account for, casing wear when setting out suitable casing string specifications for each borehole. However, the estimation of wear volume often fails to match the actual measurements. Since these estimations are often inaccurate, they incur excess costs in two forms: overly thick casing walls due to unreasonably high safety margins, and downtime to address failures of casing integrity.

DESCRIPTION OF ILLUSTRATIVE EMBODIMENTS

Illustrative embodiments and related methods of the present disclosure are described below as they might be employed to determine tubular wear volume using adjustable wear factors. In the interest of clarity, not all features of an actual implementation or methodology are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methodologies of the disclosure will become apparent from consideration of the following description and drawings.

As described herein, illustrative embodiments and methods of the present disclosure determine casing wear volume based on an adjustable wear factor. The wear factors described herein are applied as a function of a side force factor, friction factor, and/or temperature factor. As the drill string rotates inside the casing string during operation, the side force, friction and temperature of the casing string all have individual and combined effects on the wear factor. Therefore, the methods described herein take those factors into account to adjust the wear factors along the casing string. The adjusted wear factors are then used to determine the casing wear volume.

Although the present disclosure is described in relation to downhole applications using cased wellbores, the methods are equally applicable to other tubular strings such as, for example, a riser or any other tubular string in which another tubular string rotates or otherwise moves inside to produce like wear effects. Those ordinarily skilled in the art having the benefit of this disclosure realize there are a variety of alternative applications for the present disclosure.

It will also be apparent those ordinarily skilled persons that the embodiments, as described herein, can be implemented in many different embodiments of software, hardware, firmware, or a combination thereof and may be implemented in one or more computer systems or other processing systems. Any actual software code used for the specialized control of hardware to implement the methods is not limited to the detailed description. Thus, the operational behavior of embodiments will be described with the understanding that modifications and variations of the embodiments are possible, given the level of detail presented herein.

Figure 1:
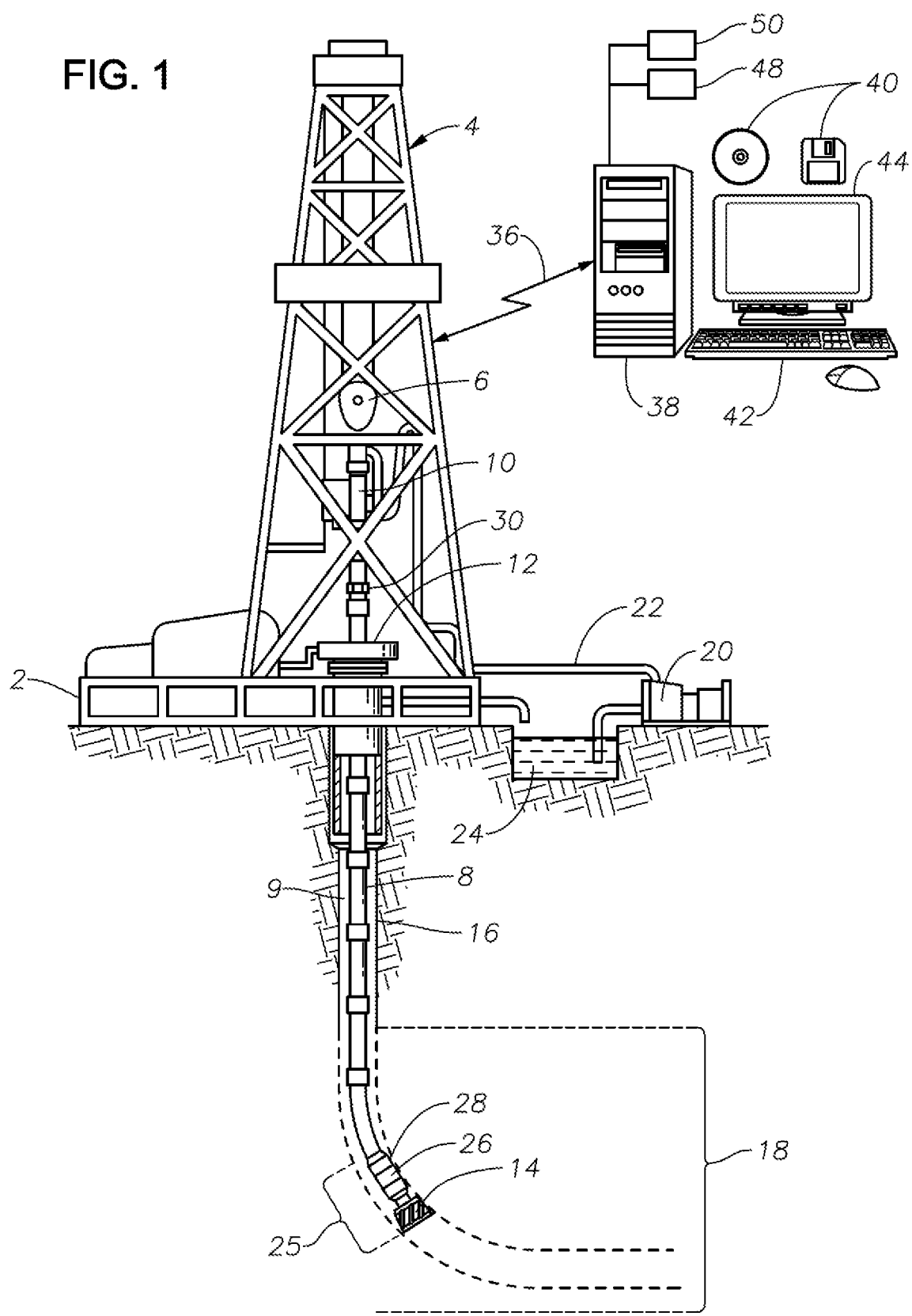
FIG. 1 shows a drilling environment in which the illustrative embodiments of the present disclosure may be practiced.

FIG. 1 shows a drilling environment in which the illustrative embodiments of the present disclosure may be practiced. In FIG. 1, a drilling rig platform 2 supports a derrick 4 having a traveling block 6 for raising and lowering a drill string 8. A drill string kelly 10 supports the rest of drill string 8 as it is lowered through a rotary table 12. Rotary table 12 rotates drill string 8, thereby turning drill bit 14. As drill bit 14 rotates, it creates a borehole 16 that passes through various formations 18. A pump 20 circulates drilling fluid through a feed pipe 22 to kelly 10, downhole through the interior of drill string 8, through orifices in drill bit 14, back to the surface via annulus 9 around drill string 8, and into a retention pit 24. The drilling fluid transports cuttings from borehole 16 into retention pit 24 and aids in maintaining the integrity of borehole 16. An upper portion of the borehole 16 is cased and the lower portion is open (uncased) borehole.

Drill bit 14 is just one piece of an open-hole logging-while-drilling ("LWD") assembly that includes a bottom-hole assembly 25 having one or more drill collars 26 and logging tool 28. Drill collars 26 are thick-walled steel pipe sections that provide weight and rigidity for the drilling process. Logging tool 28, which may be integrated into one of the drill collars, gathers measurements of various drilling or formation parameters. Illustrative drilling parameters include weight on bit, torque, and rate of penetration.

Measurements from logging tool 28 can be acquired by a telemetry sub (e.g., integrated with logging tool 28) to be stored in internal memory and/or communicated to the surface via a communications link. Mud pulse telemetry is one technique for providing a communications link for transferring logging measurements to a surface receiver 30 and for receiving commands from the surface, but other telemetry techniques can also be used. In accordance with at least some embodiments, measurements collected from logging tool 28 are processed by a computer 38 to produce one or more well logs for analysis. The contemplated logs include, for example, a tubular string wear log (e.g., casing string wear volume log).

The telemetry signals are supplied via a communications link 36 to the computer 38 or some other form of a data processing device. Computer 38 may include or be coupled to a non-transitory computer-readable medium (e.g., a hard-disk drive and/or memory) ("memory 48") and a processor 50 capable of executing instructions stored thereon. The memory 48 and processor 50 are coupled together by a bus which communicates data therebetween. Computer 38 operates in accordance with software (which may be stored on an external non-transient information storage medium 40 and/or the memory 48) and user input via an input device 42 to process and decode the received signals. The resulting telemetry data may be further analyzed and processed by a processor 50 of computer 38 to generate a display of useful information on a computer monitor 44 or some other form of a display unit. For example, an operator could employ this system to obtain and monitor drilling parameters or formation properties.

Although not explicitly shown in FIG. 1, it will be recognized that computer 38 may be connected to one or more public and/or private networks via one or more appropriate network connections. Moreover, those ordinarily skilled in the art will appreciate that the invention may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present invention. The invention may be practiced in distributed-computing environments where tasks are performed by remote-processing devices that are linked through a communications network. In a distributed-computing environment, program modules may be located in both local and remote computer-storage media, including any known memory storage devices. The present invention may therefore, be implemented in connection with various hardware, software or a combination thereof in a computer system or other processing system.

Still referring to FIG. 1, in at least some embodiments, a portion of wellbore 16 is cased. Memory 40, 48 of computer 38 includes a casing wear volume determination program which, when executed by processor 50, determines a casing wear volume along the inner wall of the casing using an adjusted wear factor. Thus, computer 38 may also be referred to as a casing wear volume determination unit. The wear factor is adjusted based upon its corresponding side force factor, friction factor, and/or temperature factor at that location along the casing string. The system further determines, based at least in part on the adjusted wear factor, the casing string wear volume as a function of position along the casing string (i.e., wear factor distribution), and may present the corresponding distributed casing wear volume to a user via a display unit, such as computer monitor 44.

As described herein, the casing wear volume determination unit defines the casing wear factor using one or more of the side force, friction, and temperature factors. In certain illustrative methods, a stiff string and/or finite element model is employed to determine the wear factor. The wear factor may be combined with measurements or estimates of other parameters such as a side force, friction, temperature and contact time to estimate the casing wear volume. Moreover, the methods may acquire measurements of the casing wear volume of the casing string and based thereon may update prior factors of the model parameters, such as the wear factor.

Figure 2:
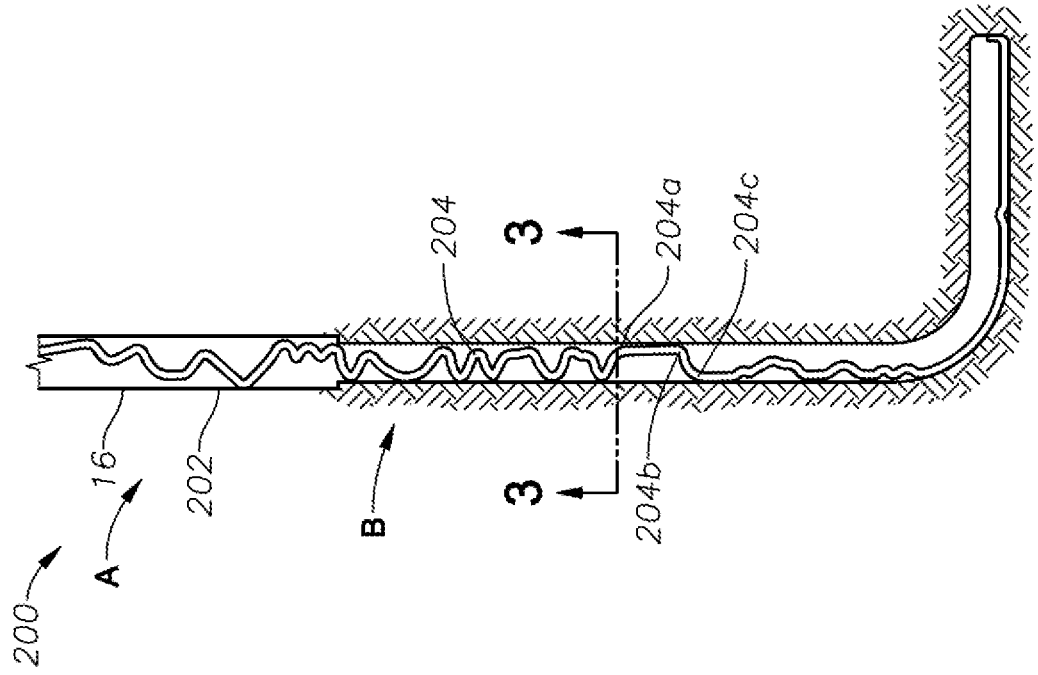
FIG. 2 shows a cross-sectional view of a portion of a cased well 200, according to certain illustrative embodiments of the present disclosure.

FIG. 2 shows a cross-sectional view of a portion of an illustrative cased well 200, according to certain illustrative embodiments of the present disclosure. The well 200 includes wellbore 16 having a casing string 202 running through a first cased portion A and a second cased portion B. In some wells, casing string 202 may have a larger diameter in cased portion A than in cased portion B. The variance in casing string diameter, thickness and type may affect the rate of wear of the casing string.

Within the casing string 202 is drill string 204 whose location may be determined via simulation in certain embodiments. The simulation may determine the location of the drill string 204 by, e.g., modeling the casing string geometry and simulating the insertion of the drill string into the casing. The simulation may employ, for example, a finite element analysis or a set of equations for a "stiff string" model. Three distinct contact points 204a-c of drill string 204 are identified in FIG. 2 and illustrated in greater detail in FIG. 3. For these contact points 204a-c, and indeed for each position along the casing string, illustrative embodiments of the present disclosure determine the casing wear volume using wear factors which are adjusted based upon the side force, friction, and temperature at contact points 204a-c.

Figure 3:
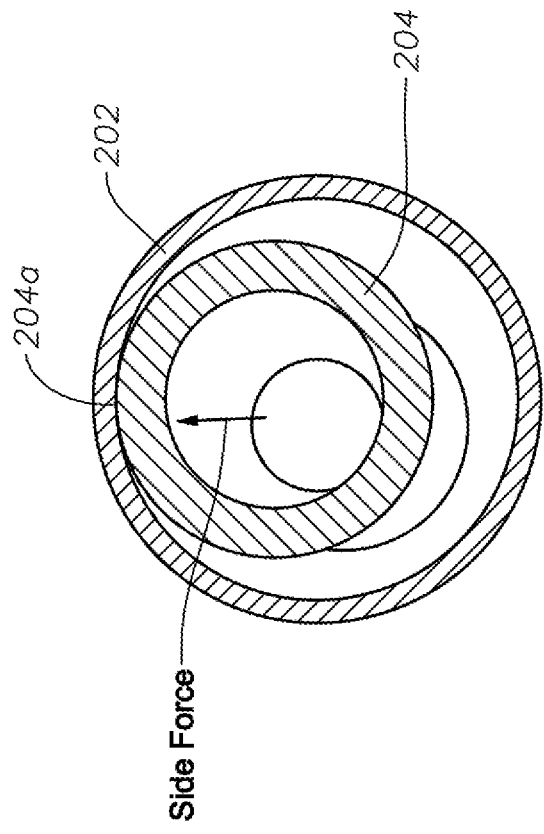
FIG. 3 is a top-down view of the drill string 204 arranged within casing string 202, along line 3-3 of FIG. 2.

FIG. 3 is a top-down view of the drill string 204 arranged within casing string 202, along line 3-3 of FIG. 2. Drill string 204 may be, for example and without limitation, a coiled tubing, additional casing or some other tubular string. Moreover, in alternate embodiments, casing string 202 may be a variety of other tubulars such as, for example, a riser utilized in deep water applications. As can be seen, drill string 204 is in contact with casing string 202 at contact point 204a. As drill string 204 rotates during operation, a side force is applied to casing string 202 at contact point 204a, friction is created between drill string 204 and casing string 202 at contact point 204a, and there is a defined temperature at contact point 204a—all of which have a singular and combined effect on the wear factor of casing string 202. As will be discussed in more detail below, illustrative methods of the present disclosure adjust the wear factor based on these other factors in order to determine the casing wear volume.

Figure 4:
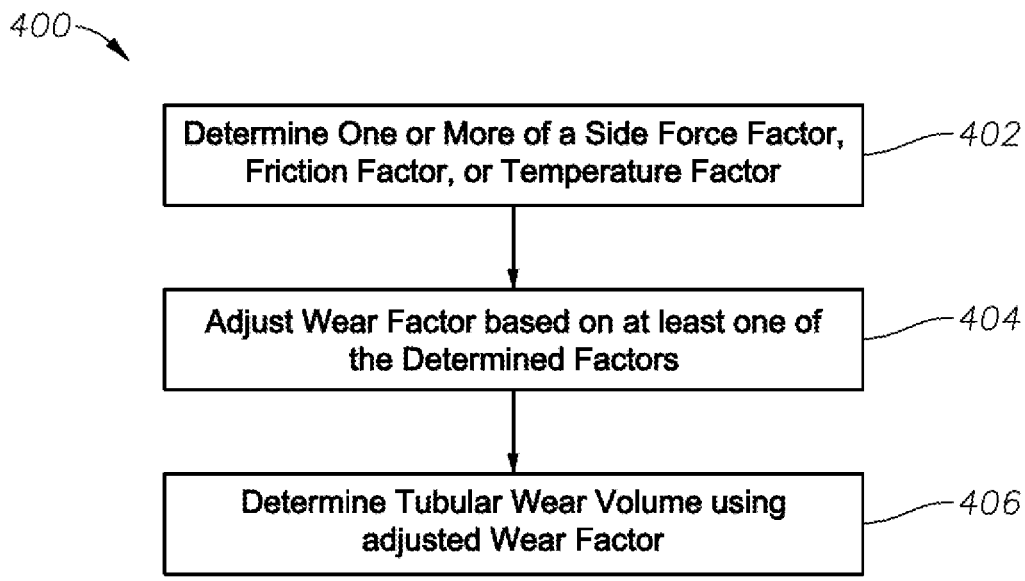
FIG. 4 is a flow chart of an illustrative tubular wear volume method 400 of the present disclosure.

FIG. 4 is a flow chart of an illustrative tubular wear volume method 400 of the present disclosure. The method 400 may be implemented by a computer system having a program stored on a non-transient computer readable medium and executed by a processor to determine the tubular wear volume, such as the computer 38, memory 48, and processor 50 described above in FIG. 1. At block 402, the processor determines at least one of: a side force factor applied to an outer tubular string; a friction factor produced between an inner tubular string and the outer tubular string; or a temperature factor along the outer tubular string. In certain illustrative methods, the casing wear volume is calculated using the wear factors, and is a function of the side force from the drill string components and rotation of the drill string. Thus, casing wear volume is given as:

$$V = \frac{\eta}{H_b} \int \mu F_n L dl = f_W \int \mu F_n L dl, \quad \text{Eq. (1)}$$

where V=casing wear volume (volume of metal removed by wear in m³; η is wear efficiency; $H_b$ is casing Brinell hardness; µ is the friction factor; $F_n$ is the side force factor; L is distance slid; dl is differential element length; and $f_W$ is the wear factor.

In the methods described herein, however, it has been found that the wear factor $f_W$ is also a function of the side force, friction, temperature and contact time at a given position along the casing string. In other words, the side force, friction, temperature and contact time each have an individual and combined effect on the wear factor. For example, the side force will increase the friction, which also increases the temperature, and so on. Accordingly, in the illustrative embodiments of the present disclosure, the tubular wear volume is rewritten using the wear factor as a function of side force, friction, temperature and contact time—as follows:

$$V = \int \mu f_w(F_n, t, \mu, T) F_n L dl \quad \text{Eq. (2).}$$

In contrast, however, conventional casing wear volume techniques have used the same wear factor for a range of depths or range of operations. In other words, traditional approaches have failed to recognize the relationship between the wear factor and the other factors of side force, friction, temperature and contact time t.

Figure 5A:
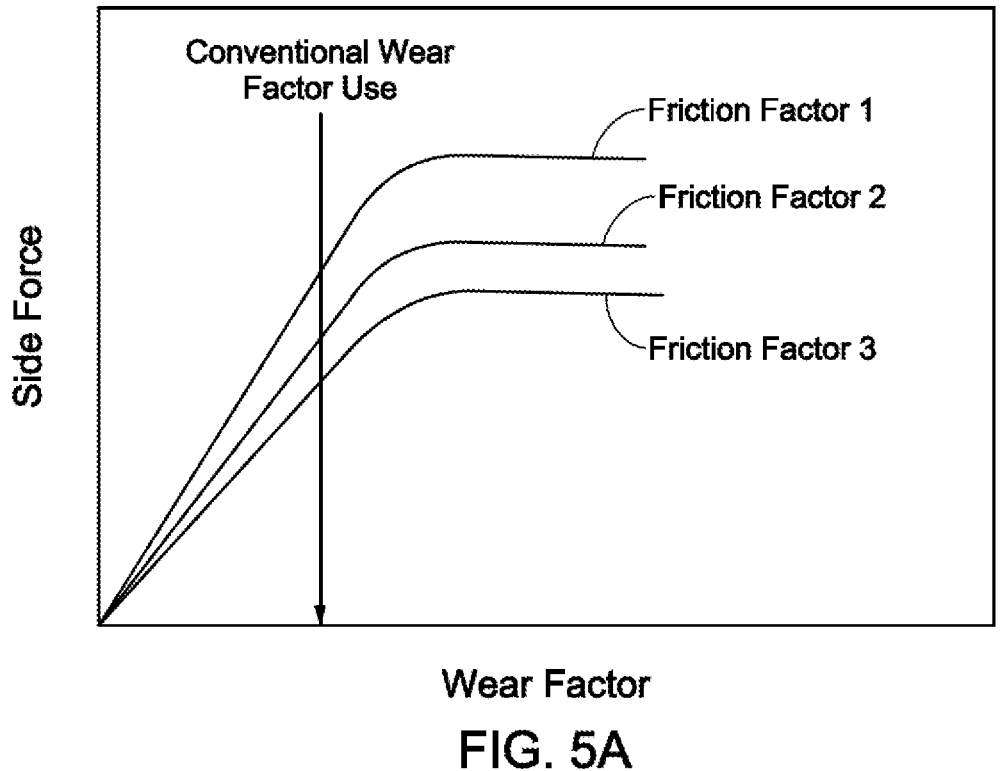
FIG. 5A is a graph contrasting the conventional approach with the illustrative methods described herein, in the context of the side force factor.

FIG. 5A is a graph contrasting the conventional approach with the illustrative methods described herein, in the context of side force. As shown in FIG. 5A, the wear, as measured by the volume (mass) loss, increases as the side force increases. Addressing the conventional approach first, we see how the conventional wear factor was a constant value—it did not change, as represented by the straight vertical line in FIG. 5A. Therefore, as the side force and friction force factors changed, the wear factor remained the same. Thus, the resulting casing wear volume did not take into account any changes in the wear due to the side force or friction factors.

In the embodiments of the present disclosure, however, we see how in FIG. 5A the wear factor (along the x-axis) is a variable which is altered based upon the friction factor and/or side force at a given location along the casing string. As a result, the casing wear volume takes into account changes in the wear factor, thus leading to more accurate determination of the wear volume.

Figure 5B:
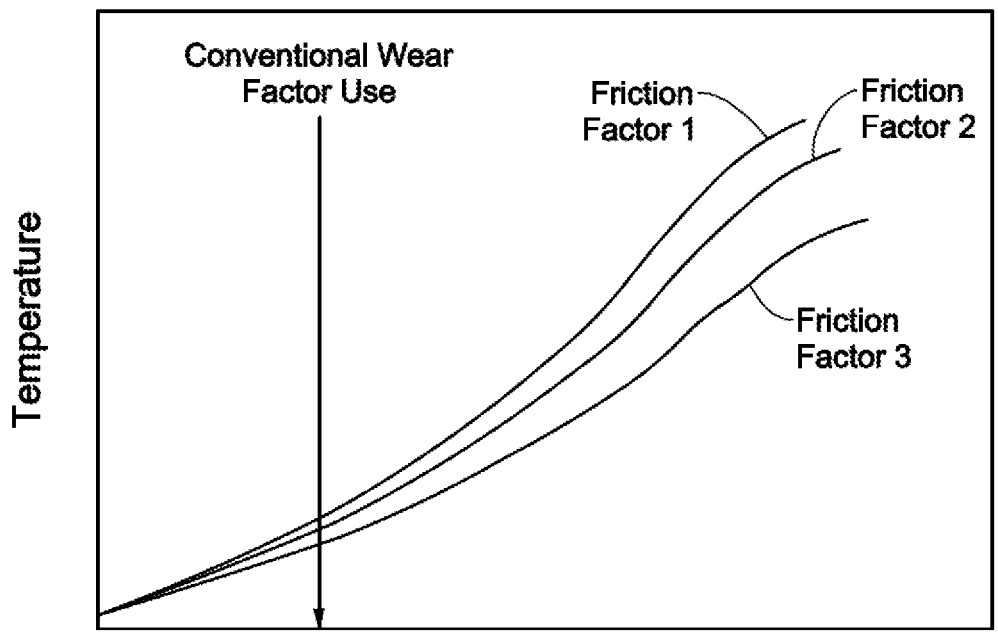
FIG. 5B is another graph contrasting the conventional approach with the illustrative methods described herein, in the context of the temperature factor.

FIG. 5B is another graph contrasting the conventional approach with the illustrative methods described herein, in the context of the temperature factor. Again, it can be seen that the conventional approach held the wear factor at a constant value, not taking into account any temperature or friction effects thereon. However, in the present disclosure, the effects of temperature and friction are used to adjust the value of the wear factor, thus resulting in a more accurate determination of casing wear volume. Therefore, the wear volume calculation is corrected based upon the side force, friction and/or temperature.

Therefore, referring back to FIG. 4, at block 402, the processor determines at least one of the side force, friction, or temperature factors. In one example, the wear factor is used along with at least two different side force factors. The side force factor $F_s$ is determined using the following relationship at any point along the casing string:

$$F_s = \sqrt{\frac{((F_e \Delta\phi)^2 + W_b^2)\gamma^2}{\sin^2\left(\frac{\Delta\phi}{2}\right)} \pm \frac{2F_e \Delta\alpha W_b \gamma}{\sin\left(\frac{\Delta\phi}{2}\right)} + (F_e \Delta\alpha)^2}, \quad \text{Eq. (3)}$$

where $$\gamma = \sqrt{\sin^2\left(\frac{\beta}{2} - \sin^2\left(\frac{\Delta\alpha}{2}\right)\right)}, \quad \text{Eq. (4)}$$

where α=inclination angle, (°); ϕ=azimuth angle, (°) $F_e$=effective tension, (lbf); and $W_b^2$=unit weight.

Figure 5C:
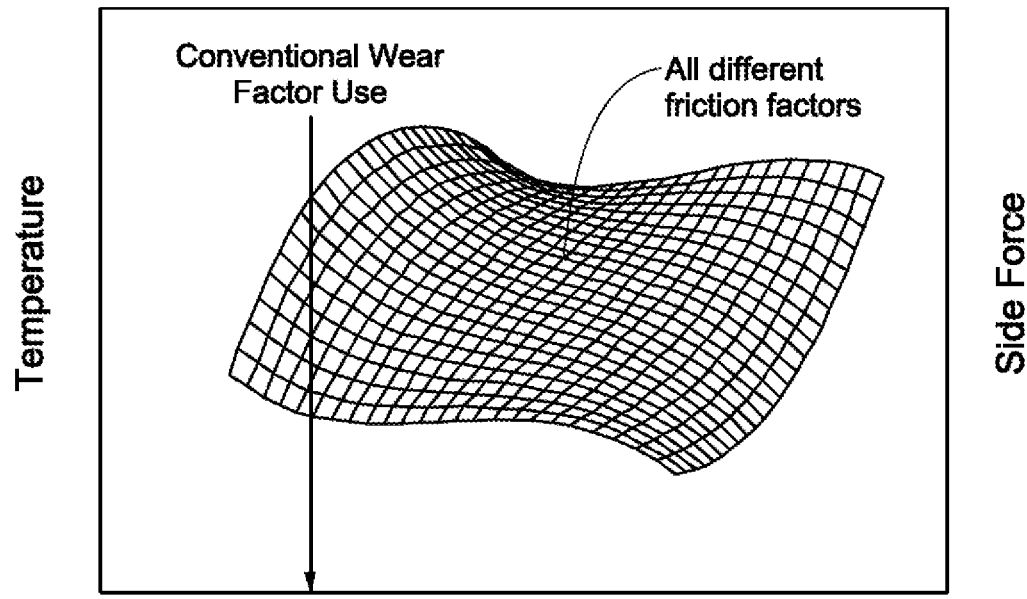
FIG. 5C is a graph contrasting the conventional approach with the illustrative methods described herein, in the context of the temperature, friction and side force factors.

Once the side force $F_s$ is determined, the system may then interpolate or extrapolate (i.e., approximate) between the side forces/temperature in cases where multidimensional models, such as that illustrated in FIG. 5C, are utilized. In the alternative, however, two-dimensional models such as those illustrated in FIGS. 5A-5B may be used without the need for any approximation techniques. Nevertheless, FIG. 5C is a graph contrasting the conventional approach with the illustrative methods described herein, in the context of temperature, friction and side force factors. Again, we see how the conventional approach kept the wear factor at a constant value. However, in this example of the present disclosure, the wear factor is adjusted as a function of temperature, friction and the side force.

Figure 6:
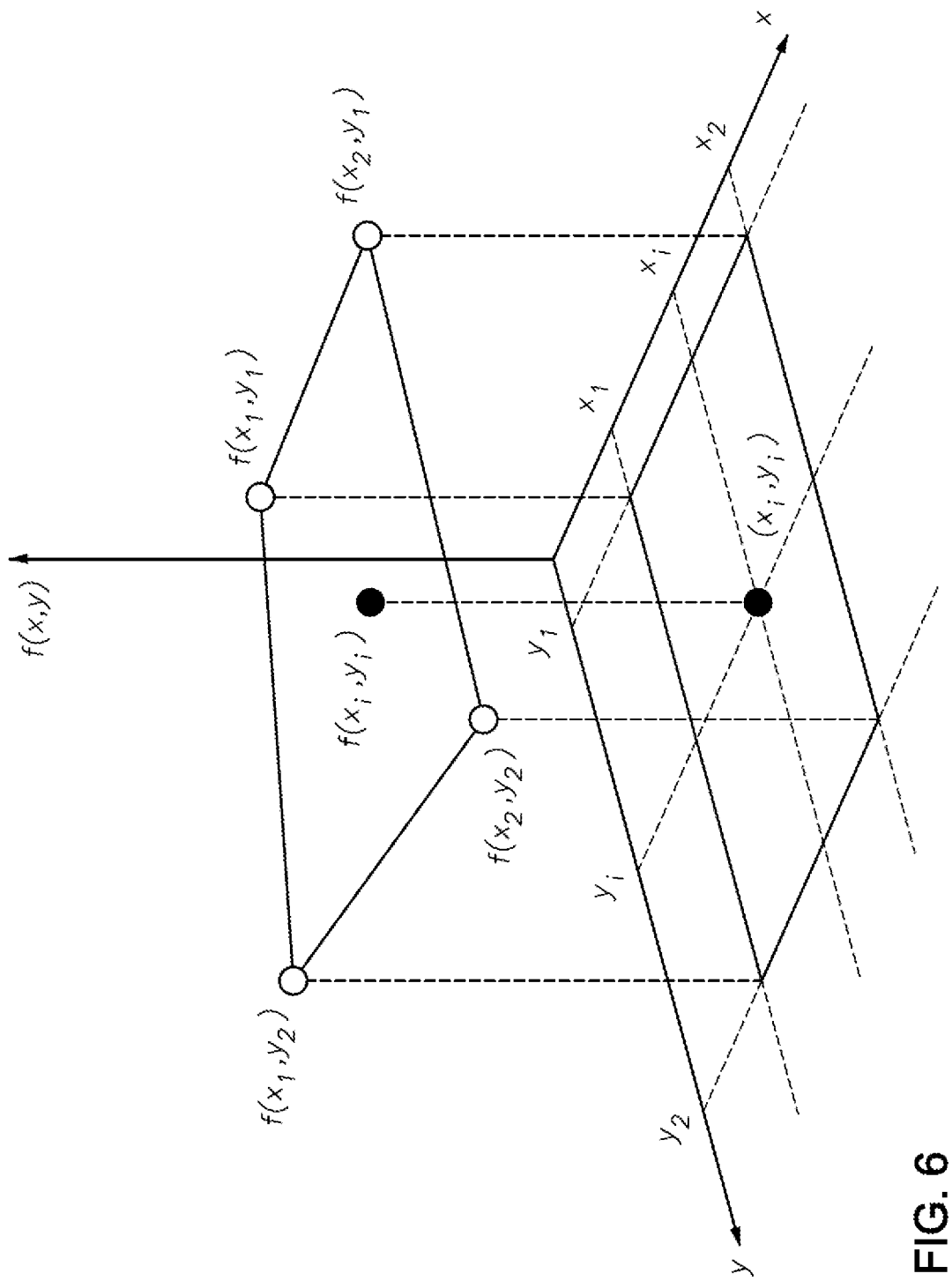
FIG. 6 illustrates a cubic interpolation technique used in certain methods of the present disclosure.

To achieve this in certain embodiments, a variety of approximation techniques may be utilized. For example, a nearest neighbor interpolation method may be used. Alternatively, a linear interpolation technique may be used. In yet another alternative method, a cubic interpolation method may be used as illustrated in FIG. 6, which shows a method of cubic piecewise interpolation in a 3 dimensional space to bracket the desired value, as will be understood by those ordinarily skilled in the art having the benefit of this disclosure. Here, since there are three variables (side force, wear factor and temperature), the wear factor corresponding to the temperature and side force have to be evaluated correctly. If the exact values are not found, respective interpolation between the temperatures (x) and side force may be carried out using cubic or other traditional interpolation method. In the illustrated example, x corresponds to temperature and y corresponds to side force. Further explanation of cubic interpolation will not be provided herein, as those ordinarily skilled in the art having the benefit of this disclosure will readily understand its application to the methods described herein.

With reference back to FIG. 4, using any desired interpolation technique in this example, the system (e.g., casing wear volume determination unit) adjusts the wear factor based on one or more of the side force, friction or temperature factors, at block 404. At block 406, using the adjusted wear factor, the tubular wear volume at any location along the casing is calculated using:

$$V = \frac{\eta}{H_b} \int \mu F_n L dl = f_W \int \mu F_n L dl. \quad \text{Eq. (5)}$$

In contrast to Equation 2, Equation 5 is expressed in function form.

Figure 7:
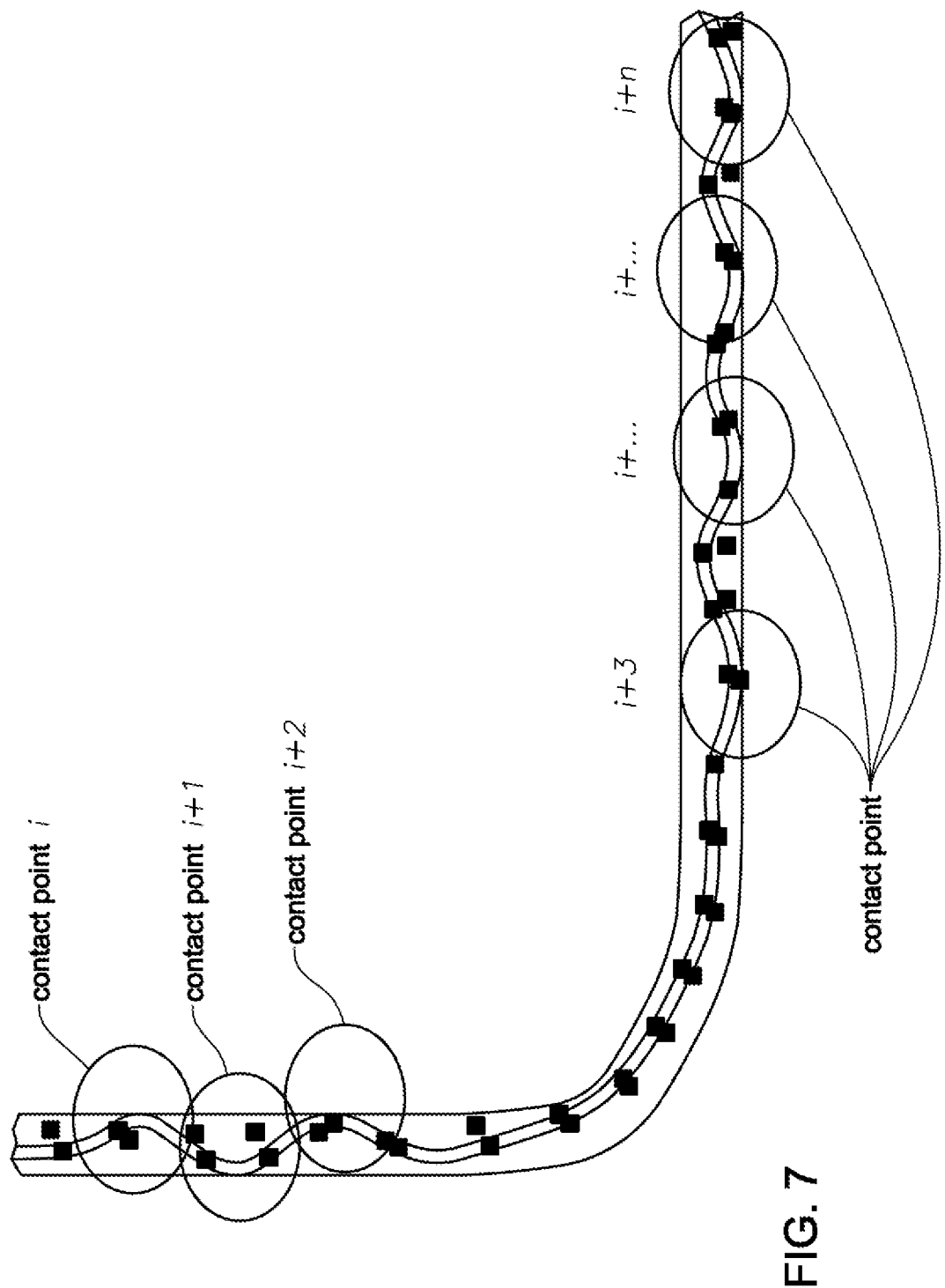
FIG. 7 shows an illustrative model showing the wear factor distribution (or casing wear volume distribution, for example), which may be generated and displayed by the system.

Thereafter, in certain embodiments, the determined casing wear volume may be integrated into a model based upon the operation and rotation of the drill string. For example, FIG. 7 shows an illustrative model showing the wear factor distribution (or casing wear volume distribution, for example), which may be generated and displayed by the system. In this example, at various contact points along the casing string, the wear volume may be determined using the multidimensional model and cubic interpolation previously described. The remaining squares represent the tool joints or other protectors along the string. Thereafter, the system may store or display the distributed casing wear volumes in graphical form or otherwise on a display unit.

The methods described herein may be applied in the planning stages of a wellbore, during a real-time operation, or during post operation analysis. If used in the planning stage, a drill string may be designed based upon the casing wear volume analysis. If used in real-time, a drill string operation may be altered based upon the wear volume calculations. In such applications, for example, as the drill string moves along the borehole, the wear factors may be continually adjusted based on the real time measurements of side force, friction and temperature. Such measurements may be obtained using various sensors positioned along the downhole assembly, as would be understood by those ordinarily skilled in the art having the benefit of this disclosure. If used in post analysis, future operations may be designed based upon the wear volume data.

Accordingly, the illustrative embodiments described herein provide accurate determination of casing wear volume by accounting for wear due to all the different components of the drill string and their associated wearing effects with respect to side force. The wear factor distribution obtained for a given operation will also help to reduce the wear by optimizing the drill string design and replacing components that cause maximum wear. Moreover, casing wear determination will reduce over designing the casing, prevent failures, and save costs.

Embodiments of the present disclosure described herein further relate to any one or more of the following paragraphs:

1. A method for determining tubular wear volume, the method comprising determining at least one of: a side force factor applied to an outer tubular string; a friction factor produced between an inner tubular string and the outer tubular string, the inner tubular string being positioned inside the outer tubular string; or a temperature factor along the outer tubular string; adjusting a wear factor along the outer tubular string based upon at least one of the side force, friction or temperature factors; and determining the tubular wear volume based upon the adjusted wear factor.

2. A method as defined in paragraph 1, wherein the inner tubular string is a coiled tubing or drill string; and the outer tubular string is a casing string or riser.

3. A method as defined in paragraphs 1 or 2, further comprising designing a drill string based upon the tubular wear volume.

4. A method as defined in any of paragraphs 1-3, further comprising adjusting a drilling operation in real-time based upon the tubular wear volume.

5. A method as defined in any of paragraphs 1-4, further comprising adjusting wear factors at multiple positions along the outer tubular string based upon at least one of a side force, friction, or temperature factor; and determining a wear factor distribution along the outer tubular string using the adjusted wear factors.

6. A method as defined in any of paragraphs 1-5, further comprising displaying the wear factor distribution on a display unit.

7. A method for determining tubular wear volume, the method comprising adjusting a wear factor along a tubular string; and determining the tubular wear volume based upon the adjusted wear factor.

8. A method as defined in paragraph 7, wherein the tubular string is a casing string or riser.

9. A method as defined in paragraphs 7 or 8, wherein the wear factor is adjusted as a function of at least one of a side force factor applied to the tubular string, a friction factor produced between an inner tubular string and the tubular string, or a temperature factor along the tubular string.

10. A method as defined in any of paragraphs 7-9, further comprising designing a drill string based upon the tubular wear volume.

11. A method as defined in any of paragraphs 7-10, further comprising adjusting a drilling operation in real-time based upon the tubular wear volume.

12. A method as defined in any of paragraphs 7-11, further comprising determining a wear factor distribution along the tubular string using multiple adjusted wear factors.

13. A method as defined in any of paragraphs 7-12, further comprising displaying the wear factor distribution on a display unit.

14. A drilling system, comprising a drilling rig that drives a drill string inside a wellbore that is at least partially cased by a casing string; and a casing wear volume determination unit coupled to the drilling rig to receive drilling parameters and responsively adjust a wear factor along the casing string and determine the casing wear volume based upon the adjusted wear factor.

15. A drilling system as defined in paragraph 14, wherein the drilling parameters comprise at least one of a side force factor applied to the casing string, a friction factor produced between a drill string and the casing string, or a temperature factor along the wellbore.

16. A drilling system as defined in paragraphs 14 or 15, wherein the casing wear volume determination unit comprises memory having casing wear volume determination software stored thereon; and a processor coupled to the memory to thereby execute the casing wear volume determination software, wherein the software causes the processor to generate and display a wear factor distribution along the casing string as a function of position.

Moreover, the foregoing paragraphs and other methods described herein may be embodied within a system comprising processing circuitry to implement any of the methods, or a in a non-transitory computer-program product comprising instructions which, when executed by at least one processor, causes the processor to perform any of the methods described herein.

Although various embodiments and methods have been shown and described, the present disclosure is not limited to such embodiments and methodologies and will be understood to include all modifications and variations as would be apparent to one skilled in the art. Therefore, it should be understood that this disclosure is not intended to be limited to the particular forms disclosed. Rather, the intention is to cover all modifications, equivalents and alternatives falling within the spirit and scope of the disclosure as defined by the appended claims.

What is claimed is:

1. A method for determining tubular wear volume, the method comprising:
    simulating insertion of an inner tubular string inside an outer tubular string;
    determining, using the simulation, one or more contact points between the inner tubular string and the outer tubular string;
    at each contact point, determining:
        a side force factor applied to the outer tubular string as a result of the inner tubular string rubbing against the outer tubular string;
        a friction factor produced as a result of rubbing between the inner tubular string and the outer tubular string, the inner tubular string being positioned inside the outer tubular string; and
        a temperature factor corresponding to the contact point;
    using the side force, temperature and friction factors to adjusting a wear factor at each contact point along the outer tubular string; and
    determining the tubular wear volume at each contact point based upon the adjusted wear factor.

2. A method as defined in claim 1, wherein:
    the inner tubular string is a coiled tubing or drill string; and
    the outer tubular string is a casing string or riser.

3. A method as defined in claim 1, further comprising designing a drill string based upon the tubular wear volume.

4. A method as defined in claim 1, further comprising adjusting a drilling operation in real-time based upon the tubular wear volume.

5. A method as defined in claim 1, further comprising:
    adjusting wear factors at each contact point along the outer tubular string based upon at least one of a side force, friction, or temperature factor; and
    determining a wear factor distribution along the outer tubular string using the adjusted wear factors.

6. A method as defined in claim 5, further comprising displaying the wear factor distribution on a display unit.

7. A system comprising processing circuitry to implement the method of claim 1.

8. A non-transitory computer-readable storage medium having computer-readable instructions stored thereon, which when executed by at least one processor causes the processor to perform the method defined in claim 1.

9. A method for determining tubular wear volume, the method comprising:
    simulating insertion of an inner tubular string inside an outer tubular string;
    determining, using the simulation, one or more contact points between the inner tubular string and the outer tubular string;
    at each contact point, adjusting a wear factor along the outer tubular string, the wear factor being based on wear caused by rubbing between the outer tubular string and the inner tubular string positioned inside the outer tubular string, a side force applied to the outer tubular string by the inner tubular string, and a temperature; and
    determining the tubular wear volume based upon the adjusted wear factor.

10. A method as defined in claim 9, wherein the outer tubular string is a casing string or riser.

11. A method as defined in claim 9, further comprising designing a drill string based upon the tubular wear volume.

12. A method as defined in claim 9, further comprising adjusting a drilling operation in real-time based upon the tubular wear volume.

13. A method as defined in claim 9, further comprising determining a wear factor distribution along the outer tubular string using multiple adjusted wear factors.

14. A method as defined in claim 13, further comprising displaying the wear factor distribution on a display unit.

15. A non-transitory computer-readable storage medium having computer-readable instructions stored thereon, which when executed by at least one processor causes the processor to perform the method defined in claim 9.

16. A drilling system, comprising:
    a drilling rig that drives a drill string inside a wellbore that is at least partially cased by a casing string; and
    a casing wear volume determination unit coupled to the drilling rig to perform operations comprising:
        simulating insertion of a drill string inside the casing string;
        determining, using the simulation, one or more contact points between the drill string and casing string;
        receive drilling parameters and responsively adjust a wear factor along the casing string and determine the casing wear volume based upon the adjusted wear factor, the wear factor being based on wear at each contact point caused by rubbing between the casing string and, a side force applied to the casing string by the drill string, and temperature.

17. A drilling system as defined in claim 16, wherein the casing wear volume determination unit comprises:
    memory having casing wear volume determination software stored thereon; and
    a processor coupled to the memory to thereby execute the casing wear volume determination software, wherein the software causes the processor to generate and display a wear factor distribution along the casing string as a function of position.

* * * * *